United States Patent [19]

Song

[11] Patent Number: 4,667,857
[45] Date of Patent: May 26, 1987

[54] PARTITIONED BOX FOR POURING A MEASURED AMOUNT OF A GRANULATED SOLID

[76] Inventor: Won I. Song, 6941 Orangethorpe Ave., Buena Park, Calif. 90620

[21] Appl. No.: 851,735

[22] Filed: Apr. 14, 1986

[51] Int. Cl.⁴ .............................................. G01F 11/28
[52] U.S. Cl. .................................... 222/454; 222/457; 222/564
[58] Field of Search ................................ 222/454–457, 222/547, 564, 353, 437, 463; 229/17 R; 221/288

[56] References Cited

U.S. PATENT DOCUMENTS

| | | | |
|---|---|---|---|
| 2,676,734 | 4/1954 | Mertens | 222/455 |
| 2,799,436 | 7/1957 | Bernhardt | 222/454 X |
| 2,896,826 | 7/1958 | Matter | 222/455 |
| 3,298,576 | 1/1967 | Sellors | 222/456 |
| 3,738,544 | 6/1973 | Brown | 222/457 X |

FOREIGN PATENT DOCUMENTS 2120782 12/1971 Fed. Rep. of Germany ...... 222/454

Primary Examiner—Joseph J. Rolla
Assistant Examiner—Kevin P. Shaver
Attorney, Agent, or Firm—Edgar W. Averill, Jr.

[57] ABSTRACT

A partitioned box for pouring a measured amount of a granulated solid. The box has a series of partitions starting at the bottom of the box and positioned along a line angled upwardly toward the pouring side of the box. A channel is formed along the pouring side of the box. As the box is moved from its upright position to a pouring position, the amount of granulated solid under the partitions is allowed to pour out of the spout. The amount released on any one pour is predetermined by the area under the partitions.

6 Claims, 7 Drawing Figures

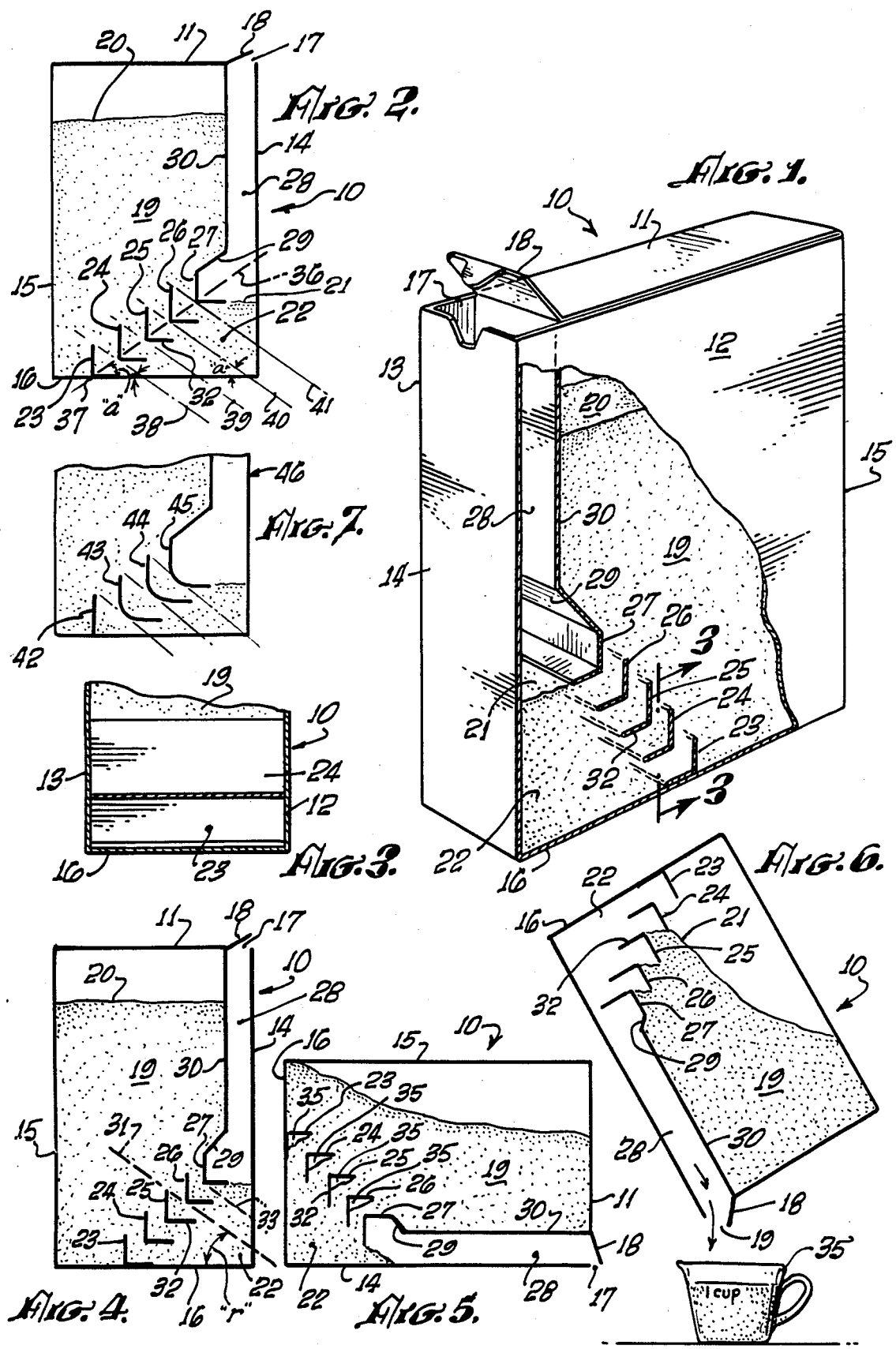

PARTITIONED BOX FOR POURING A MEASURED AMOUNT OF A GRANULATED SOLID

BACKGROUND OF THE DISCLOSURE

The field of the invention is containers and the invention relates more particularly to containers for granulated solids such as granulated soap. The invention further relates to containers which are capable of pouring a predetermined volume of granulated solids from a box for any one pour.

For many uses, the same predetermined amount of a granulated solid is used each time the box is used. For instance, for a laundry detergent, a volume such as one-half a cup is frequently used. Typically, to measure such one-half cup, either the top of the box is torn away so that the user can dip a cup into the box or the box is lifted and poured into a cup until the desired amount has been added. Since it is necessary to hold the box in one hand and the cup in the other hand, this procedure is not entirely satisfactory and also requires the use of a separate cup.

Other granulated solids such as pool chlorine or granulated instant coffee are typically used in the same volume each time. It is important that such system be low in cost.

SUMMARY OF THE INVENTION

It is an object of the present invention to provide a container for granulated solids which pours a predetermined volume of the solid each time the container is poured.

The present invention is for a partitioned box for pouring a measured amount of a granulated solid. The box is of the type having a bottom, a top, a front and a back and front and back end sides and a pouring spout at the top adjacent the front end side. The box further includes at least four generally L-shaped partitions affixed across the interior of the box from the interior of the front to the interior of the back. The point of each L-shaped partition lies along a first imaginary line starting at the bottom of the box and angled upwardly at an angle of about thrity-five degrees with respect to the bottom of the box toward the front end side. Each adjacent L-shaped partition has its point at the intersection of said first imaginary line and a second set of imaginary lines starting at the bottom of the box and lying at about thirty-five degrees with respect to the bottom of the box but angled toward the back end side of the box. The second set of imaginary lines intersect the top of each L-shaped partition. A channel is formed from the uppermost point of the uppermost L-shaped partition, which channel extends generally upwardly toward the pouring spout whereby when the spout is directed downwardly, the quantity of granulated material between the space below the L-shaped partitions flows out of said spout, and when said box is returned to its upright position, granulated material flows downwardly into said space. Preferably, the base of each L-shaped partition is no longer than the height thereof.

BRIEF DESCRIPTION OF THE DRAWINGS

FIG. 1 is a perspective view, partially cut away of the partitioned box of the present invention.

FIG. 2 is a side view of the box of FIG. 1, further including a plurality of imaginary lines describing the placement of the partitions thereof.

FIG. 3 is an enlarged cross-sectional view taken along line 3—3 of FIG. 2.

FIG. 4 is a cross-sectional side view of the box of FIG. 1 in an upright position.

FIG. 5 is a cross-sectional side view of the box of FIG. 1 turned into a horizontal position.

FIG. 6 is a cross-sectional side view of the box of FIG. 1 with its spout downwardly in a pouring configuration and further showing a container.

FIG. 7 is a diagrammatic, cross-sectional side view of an alternate configuration of partitioned box of the present invention.

DESCRIPTION OF THE PREFERRED EMBODIMENTS

A partitioned box for pouring a measured amount of a granulated solid is shown in FIG. 1 in perspective view and indicated generally by reference character 10. Box 10 has a top 11, a front 12, a back 13, a front side edge 14, a back side edge 15 and a bottom 16. Also, box 10 has a pouring spout 17 defined by pulling flap 18 upwardly.

Box 10 is filled with a granulated material such as detergent 19 which, as shown in FIG. 1, has a top surface 20 within the body of the box. It can be seen that a second top surface 21 is brought about by a plurality of partitions within the box in the manner described more particularly below. The space below the partitions is indicated generally by reference character 22, and this volume of detergent is poured out, as indicated in FIG. 6, and consists of a very accurate, repeatable volume.

As shown in FIG. 1, box 10 has five generally L-shaped partitions 23, 24, 25, 26 and 27 which are affixed to the interior surface of front 12 and back 13. Furthermore, it can be seen in FIG. 1 that a channel is formed which is indicated generally by reference character 28 and which comprises an angled wall 29 and a vertical wall 30.

In operation, granulated detergent fills the box to the level shown in FIG. 4 when the box is in an upright position. It should be noted that granulated solids tend to have a maximum slope which the upper surface of the solid is capable of reaching. This angle is commonly referred to as the "angle of repose" and for a typical detergent this is about thirty-five degrees. A dotted line indicated by reference character 31 has been drawn on FIG. 4 and its angle with respect to bottom 16 is indicated by reference character "r" which is equal to the angle of repose of the granulated solid in the box. It can be seen that the upper end of partition 25 intersects dotted line 31 but the lower leg or base 32 does not reach line 31. Because of this, detergent will flow past the terminus of base 32 into space 22 thereby filling it. Technically, detergent would flow only to line 33, but with any movement of the box, it has been found that detergent tends to fill to surface 21.

When the box is turned to the position shown in FIG. 5, detergent begins to enter channel 28 as indicated at reference character 34, and a plurality of voids 35 begin to form at the inner side of the point of each "L." As the box is further turned, as indicated in FIG. 6, the detergent in space 22 flows into cup 35. A surprisingly accurate volume is poured out for each pour. Of course, the measured contents would not have to be poured into a cup since the object of the invention is to eliminate the need for measuring. The cup illustrates the feature of the invention relating to its ability to pour an accurate volume of a granulated solid.

The partitions may be fabricated from cardboard, plastic or other material, preferably of low cost. As shown in FIG. 3, the partitions extend from the front to the back and may be affixed to the box or added as a separate insert having its own sides.

The orientation of the partitions forms an important part of the present invention and is illustrated diagrammatically in FIG. 2. The angle "a" should be no more than the angle of repose of the granulated material in the box. For most granulated materials, this is between twenty and forty degrees and usually about thirty-five degrees. It can be seen that the point or apex of each "L" lies along a first imaginary line 36 which begins at the point 37 of lowermost partition 23 and is directed upwardly toward front and side 14 at an angle "a." A second set of imaginary lines is indicated by reference characters 38, 39, 40 and 41. These lines are also at an angle "a" with respect to bottom 16 but are directed toward back edge side 15 and intersect the top edge of the vertical portion of each partition as well as intersecting the point or apex of the above adjacent partition. Thus, the higher the partition, the fewer partitions are needed.

While the drawings depict five partitions, it is, of course, contemplated that a lesser or greater number could be used. It is believed, however, that for most uses, at least four partitions are necessary to provide the requisite accuracy of pouring volume. It is believed that five partitions are appropriate for a typical detergent box. As shown in FIG. 7, the partitions need not be exactly L-shaped and may instead be curved as indicated by partitions 43 through 45 of box 46. Partition 42 is simply a vertical partition.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A partitioned box for pouring a measured amount of a granulated material, said box being of the type having a bottom, a top, a front and a back and two end sides and a pouring spout at the top adjacent one of the sides, said box further including:
    a plurality of generally L-shaped partitions affixed across the interior of said box from the interior of the front to the interior of the back, each of such L-shaped partitions having its base directed toward the pouring side of the box, each L-shaped partition having an apex lying along a first imaginary line starting at the bottom of the box and angled upwardly at an angle of between twenty and forty degrees with respect to the bottom toward the side against which the pouring spout is adjacent, each L-shaped partition having its apex at the intersection of said first imaginary line and one line of a second set of imaginary lines which start at the bottom of the box and lie at about the same angle with respect to the bottom as the first imaginary line but angled toward the side of the box opposite said pouring spout, each line of said second set of imaginary lines intersecting the top of one of said plurality of L-shaped partitions; and
    a channel formed between the interior of the front and back of the box beginning at the uppermost point of the uppermost L-shaped partition and extending generally upwardly toward the pouring spout whereby when said spout is directed downwardly, the quantity of granulated material within the space defined below said L-shaped partitions flows out of said spout and when said box is returned to its upright position, granulated material flows downwardly into said space.

2. The partitioned box of claim 1 wherein the angle of each imaginary line is about thirty-five degrees with respect to the bottom of the box.

3. The partitioned box of claim 2 wherein the vertical leg of each L-shaped partition is about equal in length to the horizontal length thereof.

4. The partitioned box of claim 3 wherein there are five L-shaped partitions.

5. A partitioned box for pouring a measured amount of a granulated material, said box being of the type having a bottom, a top, a front and a back and front and back end sides and a pouring spout at the top adjacent the front end side, said box further including:
    at least four generally L-shaped partitions affixed across the interior of said box from the interior of the front to the interior of the back, each of such L-shaped partitions having its base directed toward the front end side of the box, each L-shaped partition having an apex lying along a first imaginary line starting at the bottom of the box and angled upwardly at an angle of about thirty-five degrees with respect to the bottom toward the front end side, each adjacent L-shaped partition having its apex at the intersection of said first imaginary line and one line of a second set of imaginary lines which start at the bottom of the box and lie at about thirty-five degrees with respect to the bottom of the box but angled toward the back end side, each line of said second set of imaginary lines intersecting the top of one of said plurality of L-shaped partitions and each of said L-shaped partitions has a base which is no longer than the height thereof; and
    a channel formed between the interior of the front and back of the box beginning at the uppermost point of the uppermost L-shaped partition and extending generally upwardly toward the pouring spout whereby when said spout is directed downwardly, the quantity of granulated material within the space defined below said L-shaped partitions flows out of said spout and when said box is returned to its upright position, granulated material flows downwardly into said space.

6. The partitioned box of claim 5 wherein the space below said L-shaped partitions is about one cup.

* * * * *